A. Baumgarten,
Manf Acids
No. 93,270.
Patented Aug. 3. 1869.

Witnesses.
Chas. N. Smith
Geo. D. Waeber

A. Baumgarten

United States Patent Office.

ALFRED BAUMGARTEN, OF NEW YORK, N. Y., ASSIGNOR TO HIMSELF AND CHARLES W. WALTER, OF SAME PLACE.

Letters Patent No. 93,270, dated August 3, 1869; antedated August 2, 1869.

IMPROVEMENT IN RECEIVERS OR CARBOYS FOR THE MANUFACTURE OF MURIATIC AND OTHER ACIDS.

The Schedule referred to in these Letters Patent and making part of the same.

*To all whom it may concern:*

Be it known that I, ALFRED BAUMGARTEN, of the city and State of New York, have invented and made a certain new and useful Improvement in Receivers or Carboys for the Manufcture of Muriatic and other Acids; and I do hereby declare the following to be a full, clear, and exact description of the said invention, reference being had to the annexed drawing, making part of this specification, wherein—

The same parts are designated by like letters in both figures.

Figure 1:
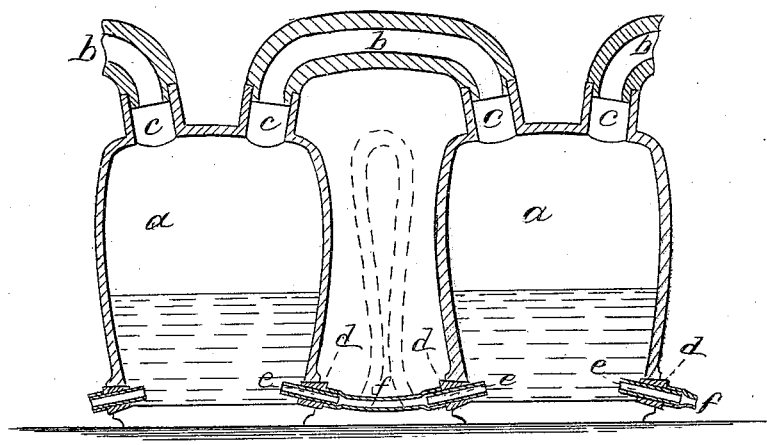
Figure 1 is a vertical section of two of said receivers.
Figure 2:
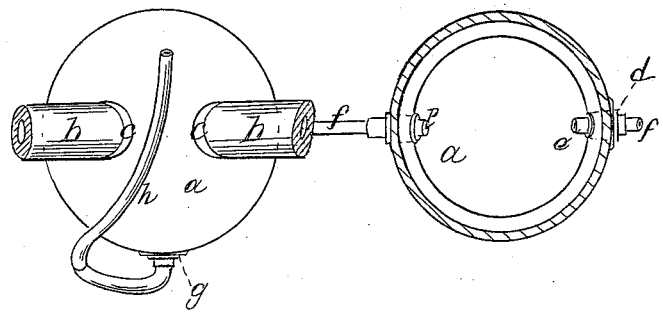
Figure 2 is a plan, showing one of said receivers sectionally.

In the manufacture of acids it is usual to employ cylinders or retorts, in which the acids or fumes are generated, and from these glazed stone-ware tubes pass to the receivers or carboys for condensing the acid.

These carboys are usually made of glazed stone-ware, and the tubes of the same are inserted into necks, and rendered tight by a luting of cement, clay, or putty.

These receivers or carboys have to be emptied or partially emptied periodically, and it has been usual to remove a stopper on a small neck at the top of each receiver, and thereby obtain access for removing the acid by a siphon. In doing this the acid is frequently rendered impure by the pieces of the clay or cement falling into it; and besides this, much time is lost in decanting by a siphon from each of the receivers, and again closing the stoppers, and the acid product varies very much in strength and quality in the different receivers.

My apparatus removes the difficulties before named, and renders the acid more pure and uniform in quality, and cheapens its production by saving labor and time.

In the drawings—

$a$ $a$ are the receivers or carboys of condensation, of any desired size or shape.

$b$ $b$ are the tubes through which the acid passes from the cylinders or retorts as usual.

The tubes $b$ $b$ are to be cemented or otherwise made tight in the necks $c$ $c$.

My special feature of improvement consists in providing holes near the bottom of each carboy, and connecting one carboy of condensation with another, so that the acid can be drawn off to nearly a uniform level in each group of receivers without disturbing the carboys or receivers themselves.

I accomplish this object by the use of perforated India-rubber or similar stoppers $d$ $d$, through which a pipe or tube of glass, or similar material, $e$, passes, and these are united in pairs by the flexible-rubber tubes $f$; and in order to provide for drawing off the acid, I form one or more of the carboys of condensation in each range with a hole, into which the stopper $g$ with a glass pipe is introduced; and $h$ is an India-rubber tube that allows for running the acid into the usual carboys, and when its end is raised above the level of the acid in the receiver, the flow or delivery is stopped.

In this apparatus the stoppers do not have to be removed, the manufacture can be nearly continuous, the purity of the acid is maintained, and the quality rendered more uniform than heretofore.

By connecting three or more carboys together, so as to form groups in the range, the acid from any one group will be of nearly uniform strength and quality when drawn from the delivery-pipe $h$ of the group, as the acid will be delivered simultaneously from all the carboys that are connected together to form a group.

The receivers farthest from the generating-cylinders are to receive water, and the same can be retained or allowed to run back, by providing a longer pipe, $f$, and leading it up and down, as seen by dotted lines, fig. 1, or bring it down horizontally.

In my apparatus, the acid can be removed hot or warm, to save time, and by the connections the strength of the acid can be varied as desired.

What I claim, and desire to secure by Letters Patent, is—

1. The carboys of condensation for acids, made substantially in the manner and for the purposes set forth.

2. The tubes and stoppers applied to and combined with the said carboys of condensation, in the manner and for the purposes set forth.

In witness whereof, I have hereunto set my signature, this 20th day of January, 1869.

A. BAUMGARTEN.

Witnesses:
 CHAS. H. SMITH,
 GEO. T. PINCKNEY.